US010775435B1

(12) United States Patent
Papameletis et al.

(10) Patent No.: US 10,775,435 B1
(45) Date of Patent: Sep. 15, 2020

(54) LOW-POWER SHIFT WITH CLOCK STAGGERING

(71) Applicant: CADENCE DESIGN SYSTEMS, INC., San Jose, CA (US)

(72) Inventors: Christos Papameletis, Binghamton, NY (US); Brian Edward Foutz, Charlottesville, VA (US); Vivek Chickermane, Slaterville Springs, NY (US); Krishna Vijaya Chakravadhanula, Vestal, NY (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/177,621

(22) Filed: Nov. 1, 2018

(51) Int. Cl.
G01R 31/3185 (2006.01)

(52) U.S. Cl.
CPC ........... G01R 31/318552 (2013.01); G01R 31/318575 (2013.01); G01R 31/318591 (2013.01)

(58) Field of Classification Search
CPC .............................. G01R 31/318552
See application file for complete search history.

(56) References Cited

U.S. PATENT DOCUMENTS

| 4,868,522 A * | 9/1989 | Popat | G06F 1/10 331/2 |
| 5,371,417 A * | 12/1994 | Mirov | G06F 1/06 327/115 |
| 5,394,443 A * | 2/1995 | Byers | G06F 1/10 327/141 |
| 5,436,573 A * | 7/1995 | Ogawa | H01L 23/5222 257/E23.144 |
| 5,712,883 A * | 1/1998 | Miller | G01R 31/31922 375/371 |
| 6,897,699 B1 * | 5/2005 | Nguyen | G06F 1/10 327/295 |
| 9,244,123 B1 * | 1/2016 | Koch | G01R 31/3177 |
| 9,602,106 B1 * | 3/2017 | Bourgeault | G06F 1/10 |
| 2002/0003445 A1 * | 1/2002 | Andrews | G06F 1/10 327/297 |
| 2002/0184560 A1 * | 12/2002 | Wang | G01R 31/31704 714/25 |
| 2003/0197537 A1 * | 10/2003 | Saint-Laurent | G06F 1/10 327/165 |

(Continued)

Primary Examiner — Joseph D Torres
(74) Attorney, Agent, or Firm — Tarolli, Sundheim, Covell & Tummino LLP

(57) ABSTRACT

Exemplary embodiments of the present disclosure relate to a clock distribution network for a scan design, which may include, for example, a clock signal network(s), and a plurality of partitioned clock signal networks coupled to the clock signal network(s) through a controlling logic(s); where the controlling logic(s) may be configured to stagger a clock signal from the clock signal network(s), and where each of the partitioned clock signal networks may be connected to a group of flip-flops. A first partitioned clock signal network of the partitioned clock signal networks may be connected to a first group of flip-flops and a second partitioned clock signal network of the partitioned clock signal networks may be connected to a second group of flip-flops, and where the first group of flip-flops may be different than the second group of flip-flops. The controlling logic(s) may include a shift register(s).

12 Claims, 14 Drawing Sheets

(56) References Cited

U.S. PATENT DOCUMENTS

| | | | | |
|---|---|---|---|---|
| 2004/0003361 | A1* | 1/2004 | Chaudhari | G06F 30/30 |
| | | | | 716/113 |
| 2004/0064799 | A1* | 4/2004 | Reyes | G06F 30/30 |
| | | | | 716/114 |
| 2005/0102643 | A1* | 5/2005 | Hou | G06F 1/10 |
| | | | | 716/104 |
| 2006/0026473 | A1* | 2/2006 | Patrick Tan | G01R 31/318541 |
| | | | | 714/726 |
| 2007/0186132 | A1* | 8/2007 | Dingemanse | G01R 31/318552 |
| | | | | 714/726 |
| 2009/0079488 | A1* | 3/2009 | Motoyoshi | G06F 1/10 |
| | | | | 327/297 |
| 2011/0066904 | A1* | 3/2011 | Lackey | G01R 31/318594 |
| | | | | 714/726 |
| 2011/0248720 | A1* | 10/2011 | Feldman | G01R 31/318536 |
| | | | | 324/537 |
| 2017/0061057 | A1* | 3/2017 | Lee | G06F 30/39 |
| 2019/0064872 | A1* | 2/2019 | Bourgeault | G06F 1/06 |

* cited by examiner

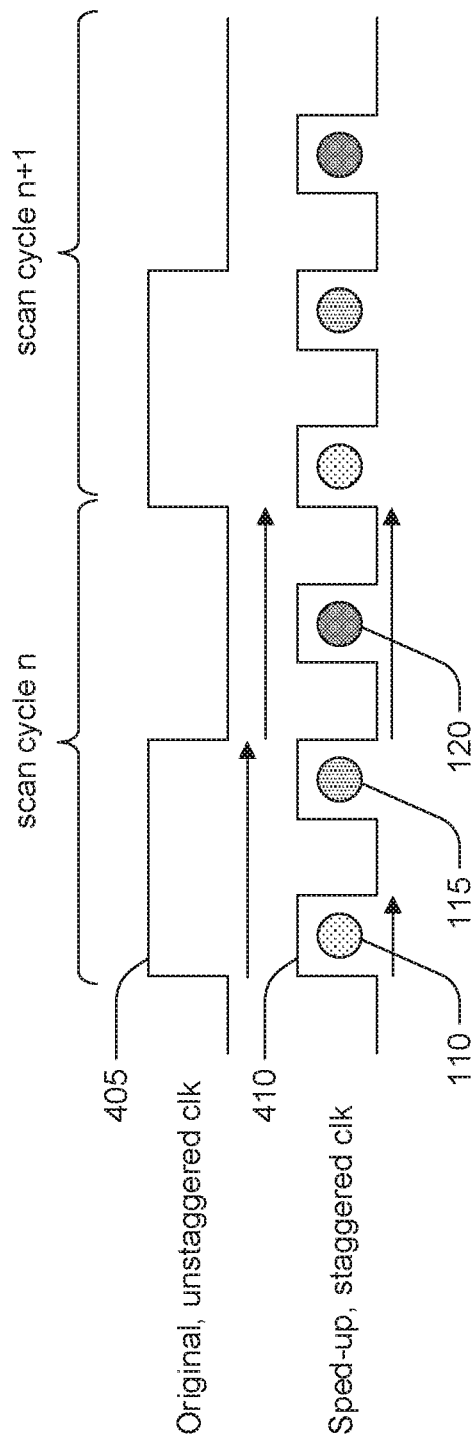

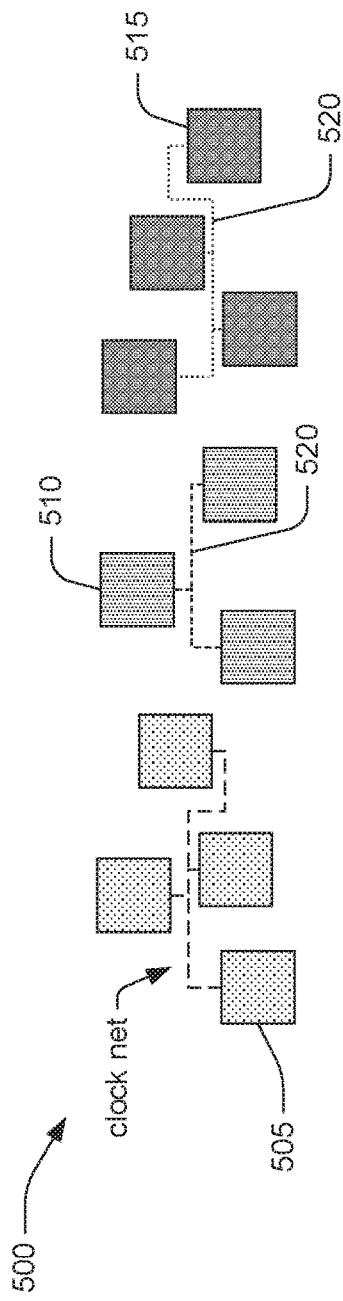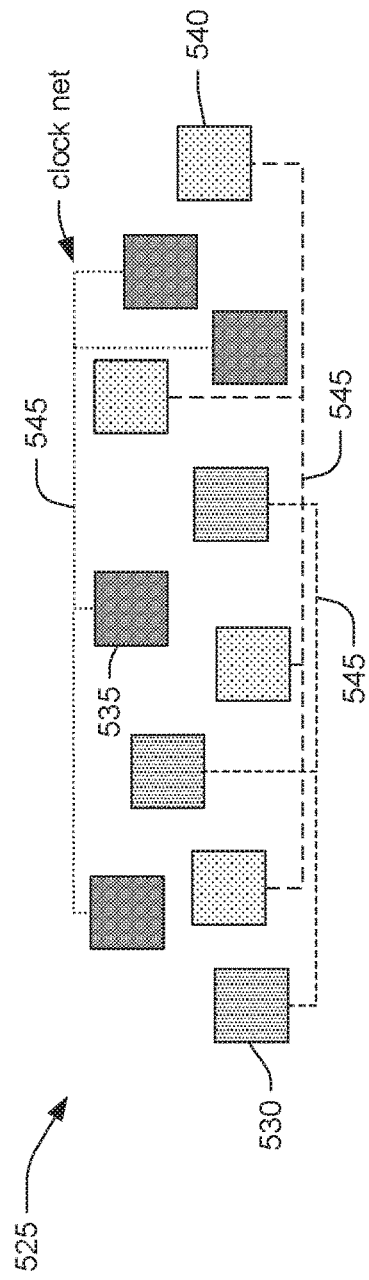
FIG. 5A
FIG. 5B

LOW-POWER SHIFT WITH CLOCK STAGGERING

TECHNICAL FIELD

The present disclosure relates generally to clock signal partitioning, and more specifically, to an exemplary system, method, computer-accessible medium, and circuit for clock shifting in a scan design.

BACKGROUND

Generally, in a scan design, the shifting of test data may result in excessive switching of the data stored in the flip-flops. Typically, in functional or system modes, there are generally only certain bursts of activity which only activate or load certain areas of a design. If a compression procedure is utilized, the data may be loaded all at once. This, however, may end up creating a lot of activity in the design, which may result in more power or voltage needed to load all of the data at once. This is generally more than what a chip may be designed for. In fact, loading of data all at once may end up creating up to a 50% average switching activity, at one time. For example, if every volume of information in the flip-flops that exists is changed, or is loaded, every other clock cycle, thus, there may be a constant power usage (e.g., 50% usage) at every cycle if the loads are alternated. This is too much power for a typical system. When there is a lot of power drawn (e.g., too much power), much more than a system was designed for, voltage droop may occur. For example, a significant voltage drop may be seen during each clock cycle.

In a typical power grid, which distributes power to different elements (e.g., different gates), a voltage drop (e.g., from an ideal voltage) may occur due to a significant amount of current being drawn based on every other data load (e.g., data switching). Since data is loaded in continuous bursts, data is always being loaded, and there is constantly a large power draw, which may result in the voltage droop. Additionally, responses are captured in flip-flops (e.g., scan chains) which may be shifted out to be observed (e.g., to observe them and determine whether a certain fault has manifested). Generally, there is limited or no control over these responses, which may result in a random mix of 0's and 1's being loaded or read, which are unnecessary bits, and which contribute to power usage. During functional operation there may be an average of 2-20% power usage (e.g., range). However, with continuous bursts, there may be up to a 50% power usage.

If there is a full scan design, artificial sequences of 0's and 1's may be generated to limit the number of transitions because there may be direct control with every single change. However, with various compression procedures, there generally are multiple don't care bits loaded. These compression procedures may leverage these don't care bits. However, there is limited or no control over these don't care bits, which may contain an arbitrary number of transitions. Don't care bits generally take the form of randomly assigned 0's and 1's, which may also increase switching and power usage.

Thus, it may be beneficial to provide an exemplary system, method, computer-accessible medium, and circuit for clock shifting in a scan design, which may overcome at least some of the deficiencies presented herein above.

SUMMARY

Exemplary embodiments of the present disclosure relate to a clock distribution network for a scan design, which may include, for example, a clock signal network(s), and a plurality of partitioned clock signal networks coupled to the clock signal network(s) through a controlling logic(s), where the controlling logic(s) may be configured to stagger a clock signal from the clock signal network(s), and where each of the partitioned clock signal networks may be connected to a group of flip-flops. A first partitioned clock signal network of the partitioned clock signal networks may be connected to a first group of flip-flops and a second partitioned clock signal network of the partitioned clock signal networks may be connected to a second group of flip-flops, and the first group of flip-flops may be different than the second group of flip-flops. The controlling logic(s) may include a shift register(s).

In some exemplary embodiments of the present disclosure, the shift register(s) may be configured to stagger a clock signal to each of the groups of flip-flops such that only one of the groups of flip-flops may receive the clock signal(s) at a time. A further controlling logic(s) may be configured to control the clock signal(s). The further controlling logic(s) may include a plurality of AND gates. Each of the AND gates may be coupled to a particular clock signal network of the clock signal networks to control the clock signal(s) provided to the particular clock signal network. The AND gate(s) may be located between the controlling logic(s) and a particular group of flip-flops coupled to the particular clock signal network. A shift enable signal(s) may be coupled to the plurality of AND gates.

In certain exemplary embodiments of the present disclosure, the shift enable signal(s) may be configured to enable a capture mode of the group of flip-flops when the shift enable signal(s) is disabled. The partitioned clock signal networks may be based on a tree network(s) determined in the clock signal network(s). The tree network may include a plurality of nodes connected to the partitioned clock signal networks, and a number of the nodes may be based on a maximum number of flip-flips in each of the groups of flip-flops. A number of flip-flops in the group of flip-flops may be based on a maximum power requirement of the scan design. The partitioned clock signal networks may be based on a wire length to each of the flip-flops in the group of flip-flops.

Additionally, an exemplary system, method and computer-accessible medium for partitioning a clock network(s) may include, dividing up a plurality of flip-flops in a scan design by clock input, generating a clock signal tree by tracing back from each clock pin of each of the flip-flops to locate nodes common to a group of the flip-flops, and partitioning the clock network(s) based on a number of the flip-flops not exceeding a predetermined number. The partitioning of the clock network(s) may include traversing the clock signal tree from a root of the clock signal tree. A clock signal associated with the clock network(s) may be staggered based on the partitioned clock network(s).

Further, an exemplary system, method and computer-accessible medium for staggering a clock signal associated with a scan design, may include sending the clock signal to a shift register(s), activating a first output of the shift register(s) and blocking all other outputs of the shift register(s), sending the clock signal through the first output to a first group of flip-flops associated with the first output, activating a second output of the shift register(s) and blocking all other outputs of the shift register(s), and sending the clock signal through the second output to a second group of flip-flops associated with the second output. Further outputs of the shift register(s) may be individually activated while all other outputs are blocked, until all outputs of the shift register(s) have the clock signal sent therethrough. The shift register may be reset after all the outputs of the shift register(s) have had the clock signal sent therethrough.

These and other objects, features, and advantages of the exemplary embodiments of the present disclosure will become apparent upon reading the following detailed description of the exemplary embodiments of the present disclosure when taken in conjunction with the appended claims.

BRIEF DESCRIPTION OF THE DRAWINGS

Further objects, features, and advantages of the present disclosure will become apparent from the following detailed description taken in conjunction with the accompanying Figures showing illustrative embodiments of the present disclosure, in which:

FIG. 4 is a timing diagram illustrating the speeding up of a clock signal;

FIGS. 5A and 5B are schematic diagrams of clock portioning networks;

Figure 1:
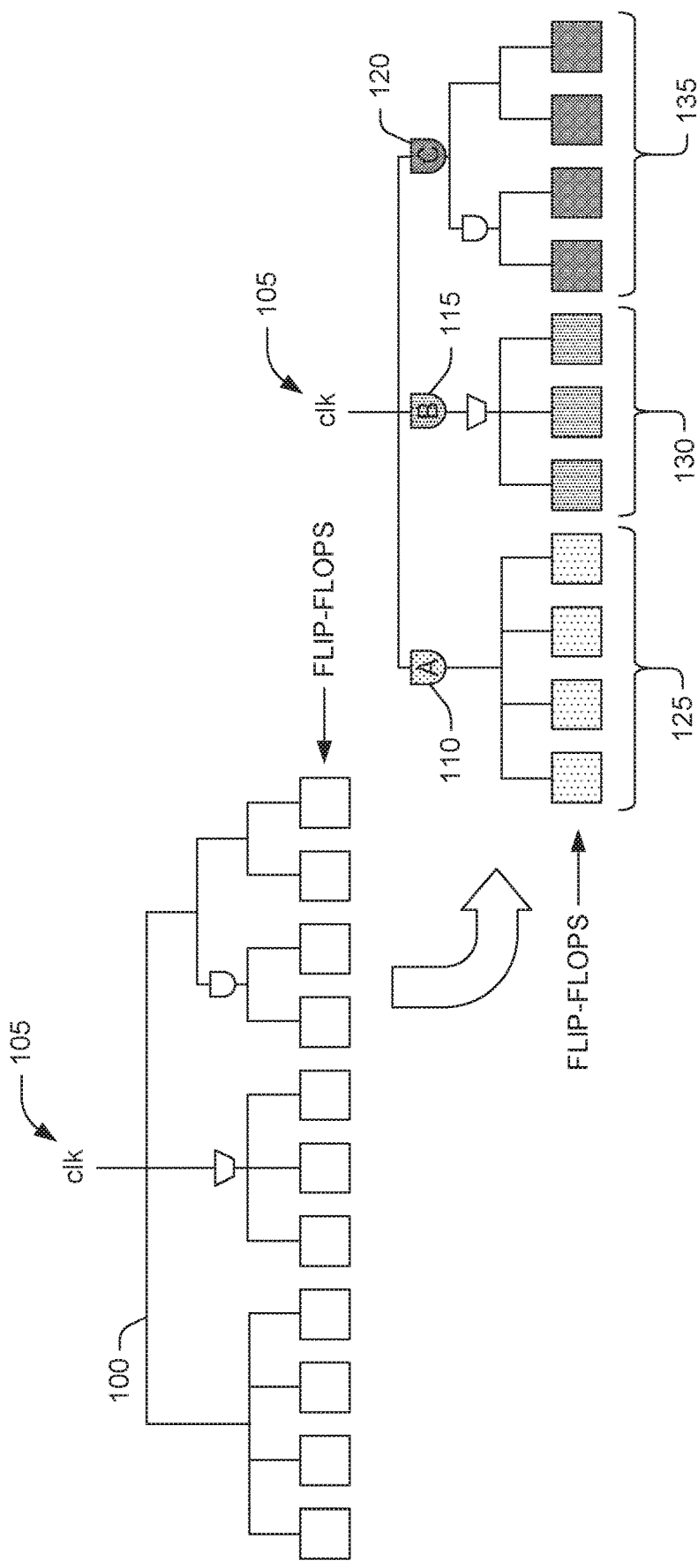
FIG. 1 is an exemplary schematic diagram of a clock distribution network and how it may be partitioned for clock staggering.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DESCRIPTION OF EMBODIMENTS

The terms "first" and "second" are used to distinguish one element, set, data, object, or thing from another, and are not used to designate relative position or arrangement in time. The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

FIG. 1 is an exemplary schematic diagram of a clock distribution network 100. In a clock distribution network 100, there may only be up to a certain number of flip-flops that may shift at a particular time (e.g., only 33% of the flip-flops may be shifted at once). If more than a certain number of flip-flops shift, then power draw may exceed a maximum targeted value, and the power distribution network may not be able to keep up (e.g., too much power may be drawn). One option is to increase the size of the power distribution network. This, however, has many drawbacks including overall power usage, and heat dissipation.

Instead of increasing the power supplied/delivered by the power distribution network, as shown in FIG. 1, the clock signal 105 may be staggered based on the amount or percentage of flip-flops that may be allowed to shift at any given time. For example, if 33% of the flip-flops shift at once, then the clock signal may be staggered as 3 separate clock pulses (e.g., pulses through each control logic 110, 115, and 120). Thus, each single staggered clock pulse may one only reach up to 33% of the flip-flops at a time. This may create groups of flip-flops (e.g., groups 125, 130, and 135) and only flip-flops in a particular group may be pulsed at a time. In particular, as shown in FIG. 1, flip-flop group 125 may be associated with control logic 110, flip-flop group 130 may be associated with control logic 115, and flip-flop group 135 may be associated with control logic 120.

Depending on the number of flip-flop groups, multiple "AND" gates (e.g., control logic) may be added after the parent clock pulse. As shown in FIG. 1, if there are 3 clock groups, then there may be three sets of different control logic. If there are more flip-flop groups, then there may be more sets of control logic. Hardware may be used to selectively control the "AND" gates to only activate certain "AND" gates at a time; thus ensuring that only one group of flip-flops is activated at a given time. It may also be possible to activate more than one flip-flop group at a time depending on the maximum power draw per shift cycle and the amount of power draw for the flip-flop groups (e.g., two flip-flop groups may be activated at once if the combined power draw is less than a maximum power draw allowed for the power distribution network.

Figure 2:
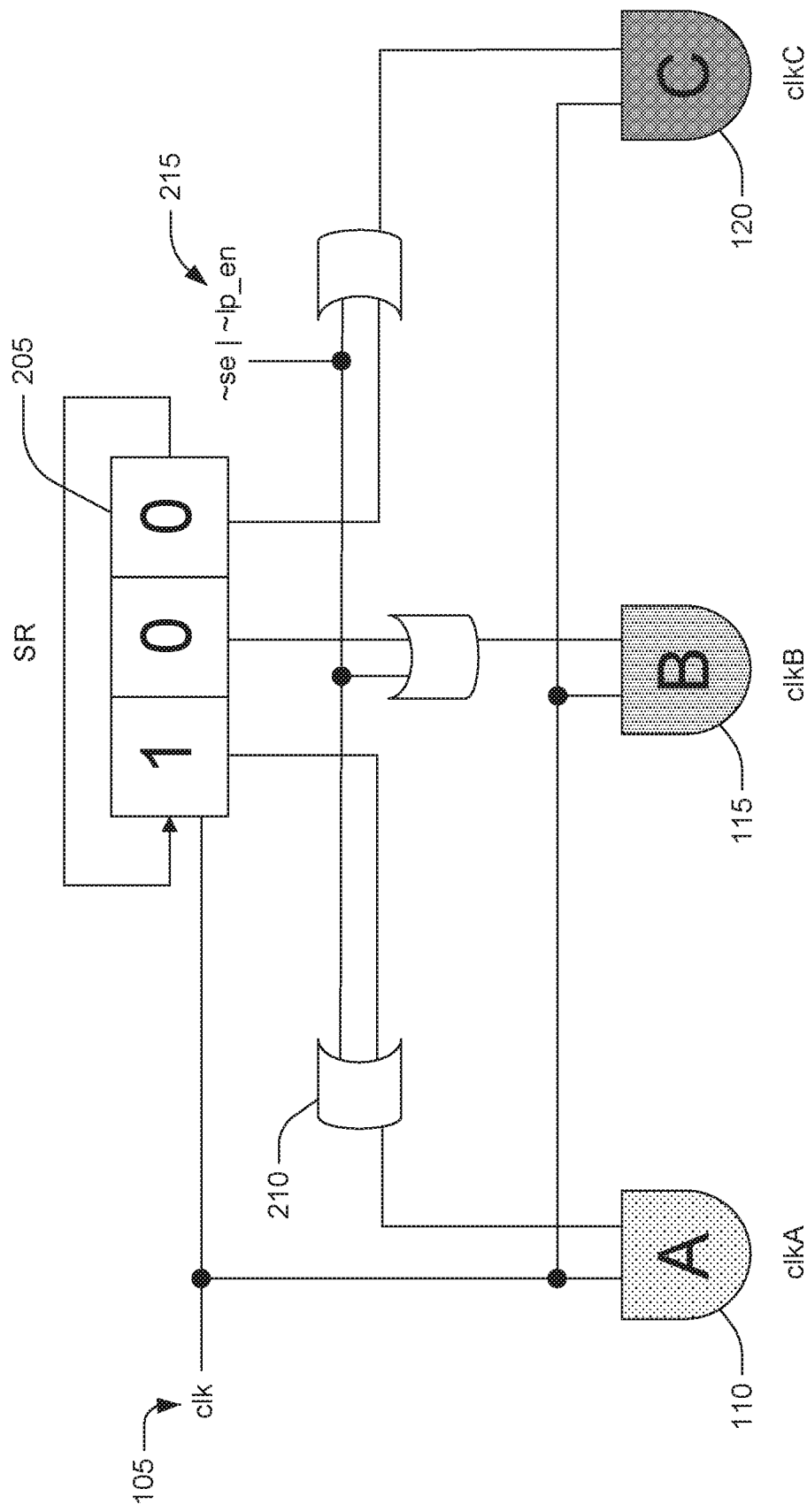
FIG. 2 is an exemplary schematic diagram of a staggered clock signal and the logic used to generate the staggered clock signal.

FIG. 2 is an exemplary schematic diagram of a staggered clock signal. For example, clock signal 105 may be input into a shift register 205. The size of shift register 205 (e.g., the number of outputs) may be based on the number of staggered clock cycles (which is discussed in more detail below). Each output of shift register 205 may be input in a set of control logic (e.g., AND gate 210), which may then be coupled to clocks that feed groups of flip-flops (e.g., clocks 110, 115, and 120). A shift enable signal 215 may also be input into AND gate 210, to control shifting of the flip-flops in each group.

Shift register 205 is used to ensure that only one (e.g., the selected) AND gate is active at a time. Shift register 205 may initially be set to "100", when shift enable signal 215 is active or high (e.g., set to 1), to facilitate the first staggered clock pulse to be provided to clock 110 to feed a group of flip-flops connected to clock 110. When the clock 105 pulses one time any shift register output set to "1" will allow pulse to pass through. After a clock pulse, the 1 value may shift to the next output (e.g., "010"). This additional clock pulse will only make it through the second clock gate to clock 115 which is connected to a different group of flip-flops. This process will continue until all flip-flop groups have been provided a clock pulse. Then, after the final clock pulse, the shift enable signal 215 may be disabled or low (e.g., set to 0), and a capture phase of the flip-flops may be performed, and shift register 205 may be reset (e.g., back to "100"). This may be performed at the end of a scan operation, for example, after the above process has been repeated with the shift enable signal held high at least as many times as the number of flip-flops in the longest scan chain. For every round completed, all scan chains may be have shifted by one bit.

Figure 3:
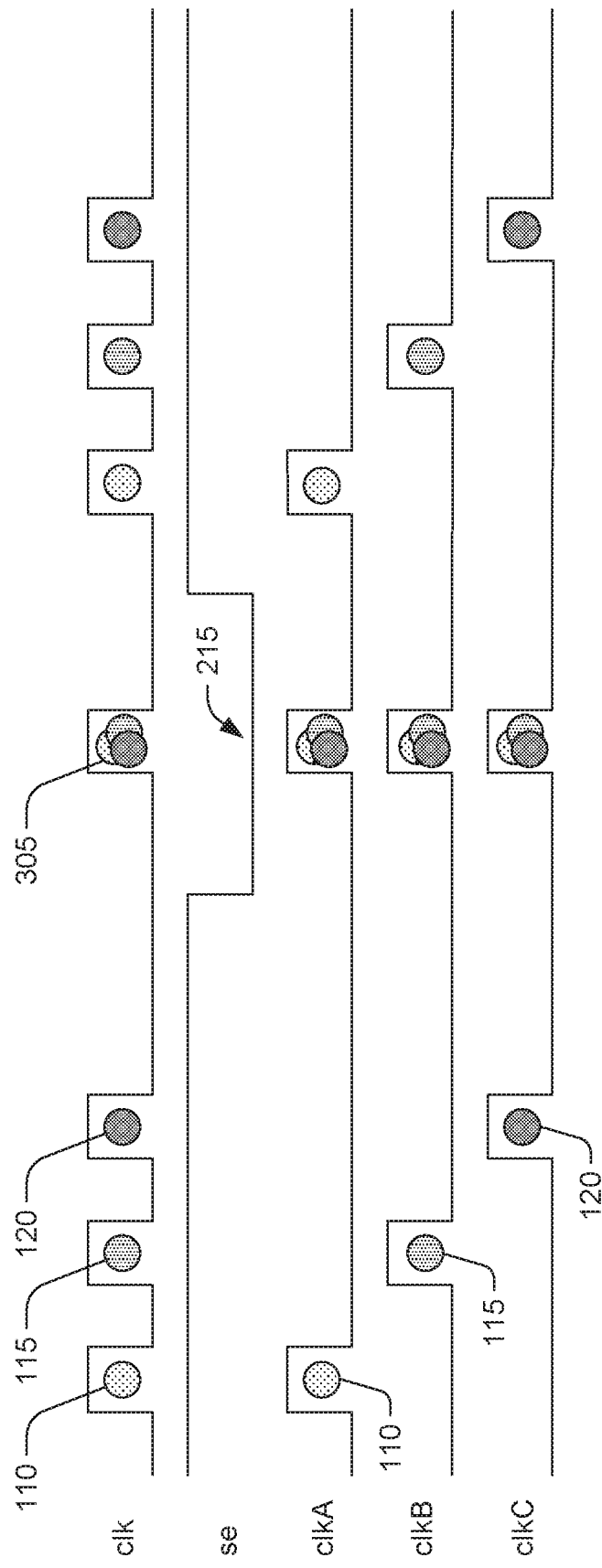
FIG. 3 is a timing diagram of staggered clock signal waveforms.

FIG. 3 is a timing diagram of staggered clock signal waveforms. Instead of pulsing a single clock once to feed all flip-flops, the clock is pulsed multiple times (e.g., the clock is sped up as compared to the pulsing of a single clock once) based on the number of clock partitions (e.g., the number of groups of flip-flops and the corresponding number of clocks that feed these groups). For example, as shown in FIG. 3, clk is pulsed three times (e.g., corresponding to three flip-flop groups each having their own clock), which corresponds to clocks 110, 115, and 120. In this exemplary case, clkA, corresponding to clock 110 is pulsed first (e.g., using shift register 205 shown in FIG. 2), clkB, corresponding to clock 115, is pulsed second, and clkC, corresponding to clock 120, is pulsed last. This results in a staggered clock signal such that not all flip-flops are shifted at the same time, which limits the overall power usage at any given point in time. This staggered clock pulsing may occur when data is loaded or unloaded from the flip-flops.

During the staggered clock pulse sequence, the shift enable signal 215 may be high or active. After a staggered clock pulse sequence has been performed, the shift enable signal 215 may be disabled or low, for the capture phase to be performed. This may occur using a combined pulsing of all clocks 305. After the capture phase has been performed, the staggered clock signal may be repeated with the shift register reset.

FIG. 4 is a timing diagram illustrating the speeding up of a clock signal. One benefit of using a compression procedure is the decreased test time. However, the exemplary system, method, and computer-accessible medium facilitates a staggered clock signal 410. Thus, multiple clock signals are now applied instead of a single, long, clock pulse 405. In order to facilitate the staggered clock pulses 410, whenever staggered shift modes are enabled, the clock needs to be sped up. Thus, each staggered clock pulse 405 is faster than a non-staggered clock pulse 410. The exemplary clock pulses may be narrower to fit within the same period. For example, the staggered clock pulses may be sped up to fit within the same clock period as the non-staggered clock pulse. If there are 4 staggered clock pulses, this may result in 4 mini clock pulses in the same single pulse period. Thus, the scan cycle does not change even when using staggered clock pulses. The timing for each staggered clock pulse may depend on the number of flip-flop groups (e.g., the number of clock groups) to be pulsed.

FIGS. 5A and 5B are schematic diagrams of two different clock partitioning networks 500 and 530. For example, in order to minimize the space and overhead of the clock insertions, it may be beneficial to achieve clock staggering by only inserting clock gates into the clock network (e.g., not inserting a clock multiplexer). This may minimize the effect of the clock insertions on the clock network. In order to achieve this, it may be beneficial to try to reuse the existing functional clock network, and to account for physical locations of the clock gates. Previously, if there were flip-flops in a particular location, all flip-flops would receive the same clock. With staggered clock pulses, there are separate clock networks. Setting up a clock network may be very efficient, very inefficient, or somewhere in between. A very efficient clock network may be achieved by minimizing wire length and minimizing wire overlap.

FIG. 5A illustrates a very efficient clock network 500. For example, as shown therein, clock network 500 may include three smaller clock networks 505, 510, and 515, which may correspond to three separate staggered clock pulses. Each of the three clock networks 500, 510, and 515 may include clock wiring 520 connecting each flip-flop in the network. It is beneficial to minimize clock wiring 520. Thus, the flip-flops chosen for a particular clock group may be based on the wiring distance (e.g., they may be chosen to minimize wire length).

FIG. 5B illustrates a very inefficient clock network 525. The flip-flops in clock network 525 are in the same position as the flip-flops in FIG. 5A. However, clock network 525 includes different smaller clock networks 530, 535, and 540. As shown in FIG. 5B, clock wiring 545 is much longer than clock wiring 520 from FIG. 5A. This results in a very inefficient clock network. Therefore, as shown in FIGS. 5A and 5B, the flip-flops chosen for a particular clock network may have an impact on the efficiency of the overall clock network.

When setting up the efficient clock network, it is beneficial to ensure that the clocks do not lose their shift register characteristics. In order to achieve this, the order of staggered clock pulses may depend on the location of the flip-flops. For example, it may be beneficial to pulse flip-flops located at the end of a scan chain first and pulse flip-flops located at the beginning of the scan chain last. Thus, when setting up the network, it may be beneficial to ensure that flip-flops are stitched together in a specific order depending on their order for the clock pulsing.

Exemplary Clock Network Partitioning

In order to achieve a very efficient clock network, various clock networking partitioning procedures may be used. In one exemplary clock partitioning procedure, the scan elements in the network may be divided by the clock. A trace back from each scan element may be performed to locate any common clock elements. If there is a clock gate or mux, or any other logic gate that drives a clock, it may be beneficial to preserve these gates. During the trace back, particular groups of flip-flops may be grouped together to form a clock tree. Once the root of the clock network has been reached, then the clock tree may be traversed to break up any nodes (e.g., leaves of the tree may be the clocks to partition). Any time a node is reached in the clock tree that is larger than the target length (as discussed below), then it may be beneficial to break down the nodes into different staggering partitions until all partitions are at or smaller than the target partition size. This may be based on switching activity limit per clock unless certain grouping is enforced by common clock path gates. For example, this may depend on the functional specification of the chip and the defined margins of the power distribution network.

In order to partition a clock network, the clock network may be mapped with root and intermediate nodes which may be logic gates within the tree (e.g., the clock network tree). The network mapping may be based on a number of determined partitions. To determine the number of partitions, one exemplary option is to take a target maximum voltage usage (e.g., as a percentage) divided into 50% which is the average switching activity without clock staggering. For example, if the target switching activity per clock group is 6.25% of the total voltage then there are 8 partitions (e.g., 50%/6.25%=8). Thus, at least 8 partitions are needed in order to keep maximum switching activity no greater than 6.25% per group. In this example, 6.25% is the maximum per group, and it may be beneficial to have one or more groups less than the maximum per group switching activity. Thus, additional partitions (e.g., greater than 8) may be created.

After the minimum number of partitions has been determined, the number of flops (e.g., scan bits) in a network per partition is determined. This may be performed by dividing the number of flops in the design by the number of determined partitions. For example, using 8 partitions determined above, if there are 120 total flops in a design, the 120 clocks are divided by 8, which provides a maximum of 15 flops per partition. Using the maximum number flops per partition, the clock network tree may be traversed to breakup nodes such that no node is larger than the determined number of maximum flops per partition (e.g., 15 flops in this exemplary scenario). When traversing the clock network tree, multiple nodes that equal less than the maximum number per partition may be combined. For example, if one node has 4 flops and another node has 3 flops, these two nodes may be combined into one partition that includes 7 flops. However, a node having less than the determined maximum number of partitions may not be combined with another node if the nodes are not located near each other as this may generate an inefficient clock network as discussed above. It may also be possible to borrow one flop from another group to balance out subnodes in a node. For example, it may be beneficial for the number of flops in each node to be as close as possible to other adjacent or nearby nodes (e.g., each node has a similar number of flops).

Figure 6A:
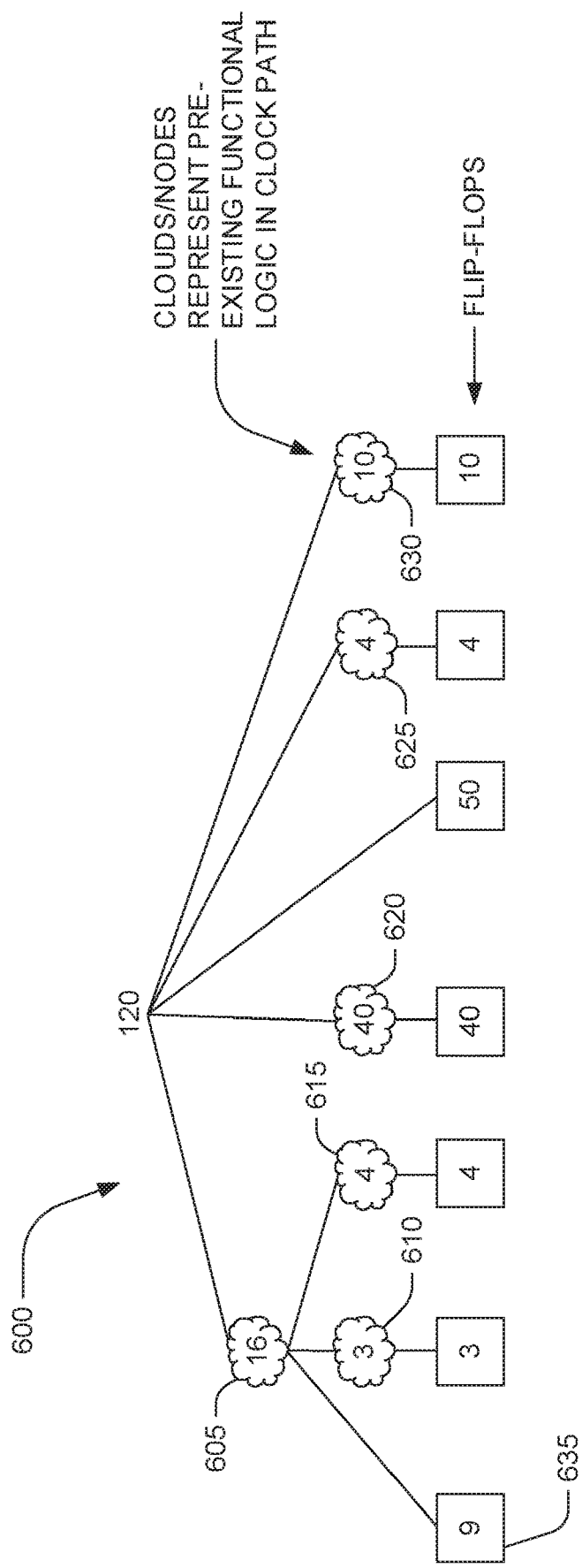
FIGS. 6A-6F are schematic diagrams illustrating a procedure for partitioning a clock signal.
Figure 6B:
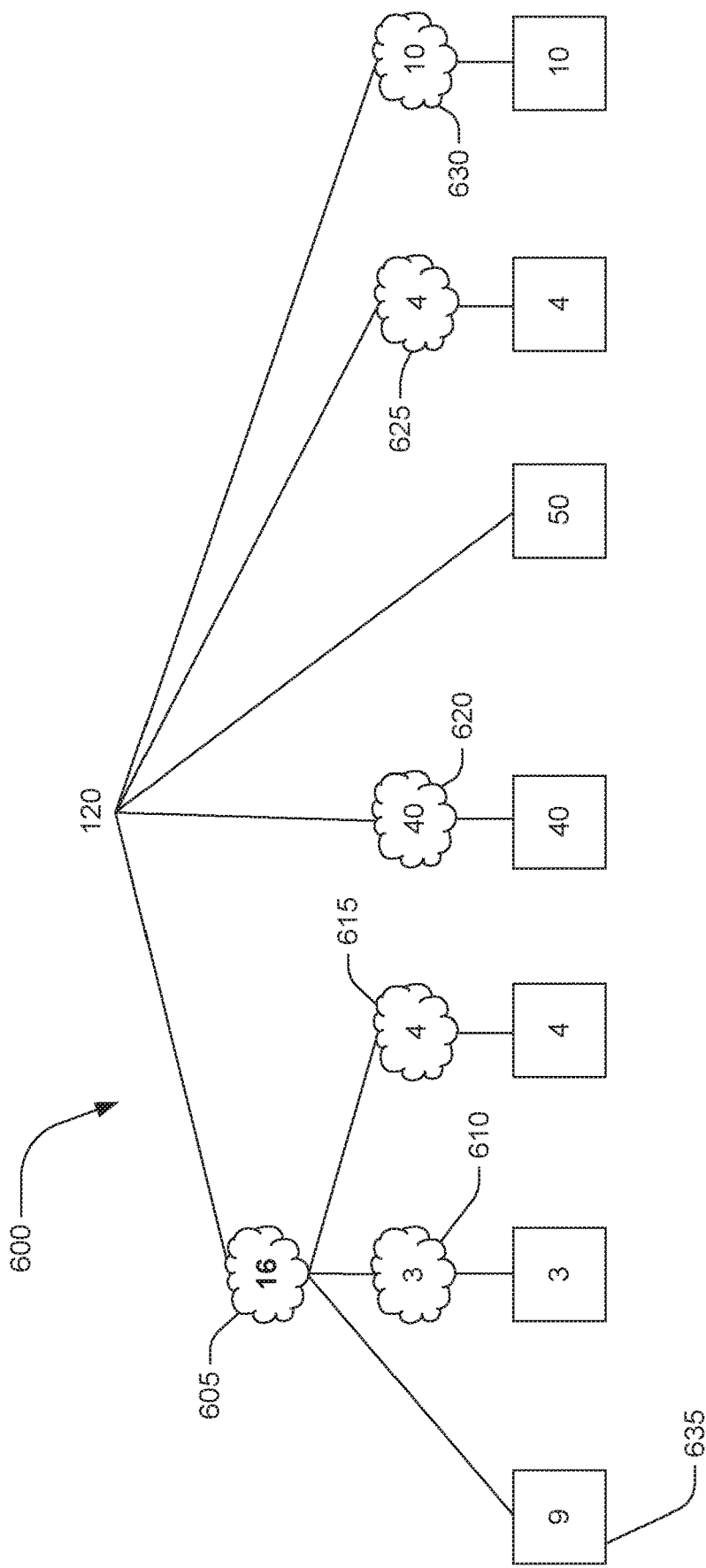
Figure 6C:
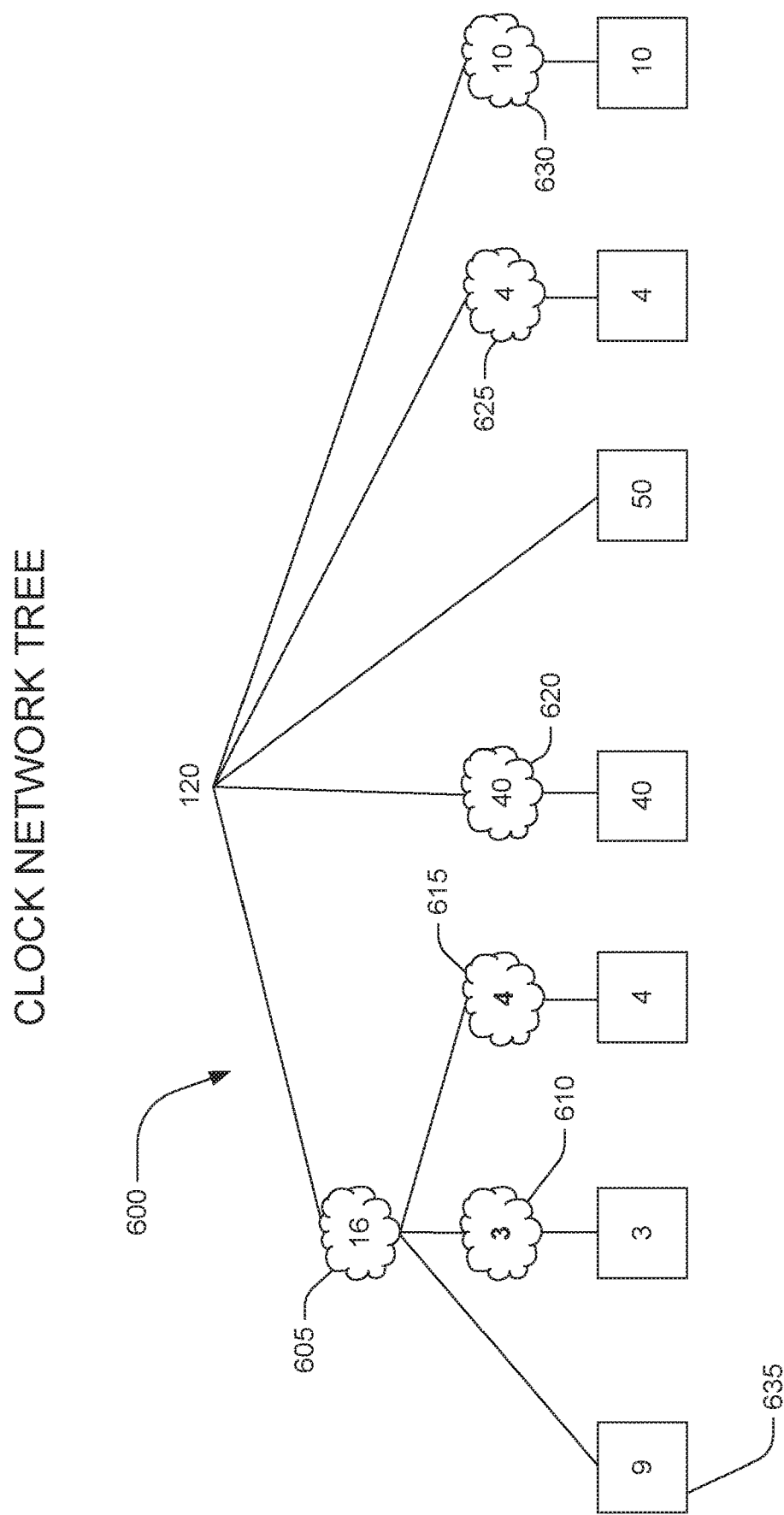

FIGS. 6A-6F are schematic diagrams illustrating a procedure for partitioning a clock signal after a trace back procedure has been performed based on the example described above; clouds/nodes represent pre-existing functional logic in the clock path. The clock tree partitioning procedure is based on a maximum number of 15 flip-flops per clock partition. As shown in FIG. 6A, clock network tree 600 includes 120 flip-flops. Clock network tree 600 includes 6 nodes (e.g., node 605, node 610, node 615, node 620, node 625, and node 630). As shown in FIG. 6B, node 605 contains 16 flips-flops, and includes node 610 (with 3 flip-flops) and node 615 (with 4 flip-flops). Since node 605 contains 16 flip-flops, which is greater than maximum number of flip-flops allowed per partition (e.g., 15 flip-flops), node 605 needs to be partitioned to be less than the 15 flip-flops allowed per partition. As shown in FIG. 6C, traversing past node 605, nodes 610 and 615 each contain less flip-flops than the maximum number of flip-flops per partition (e.g., node 610 contains 3 flip-flops and node 615 contains 4 flip-flops). Thus, there is no need to further partition nodes 610 and 615. Node 605 also contains flip-flops 635, which include 9 flip-flops not contained within any subnodes.

Figure 6D:
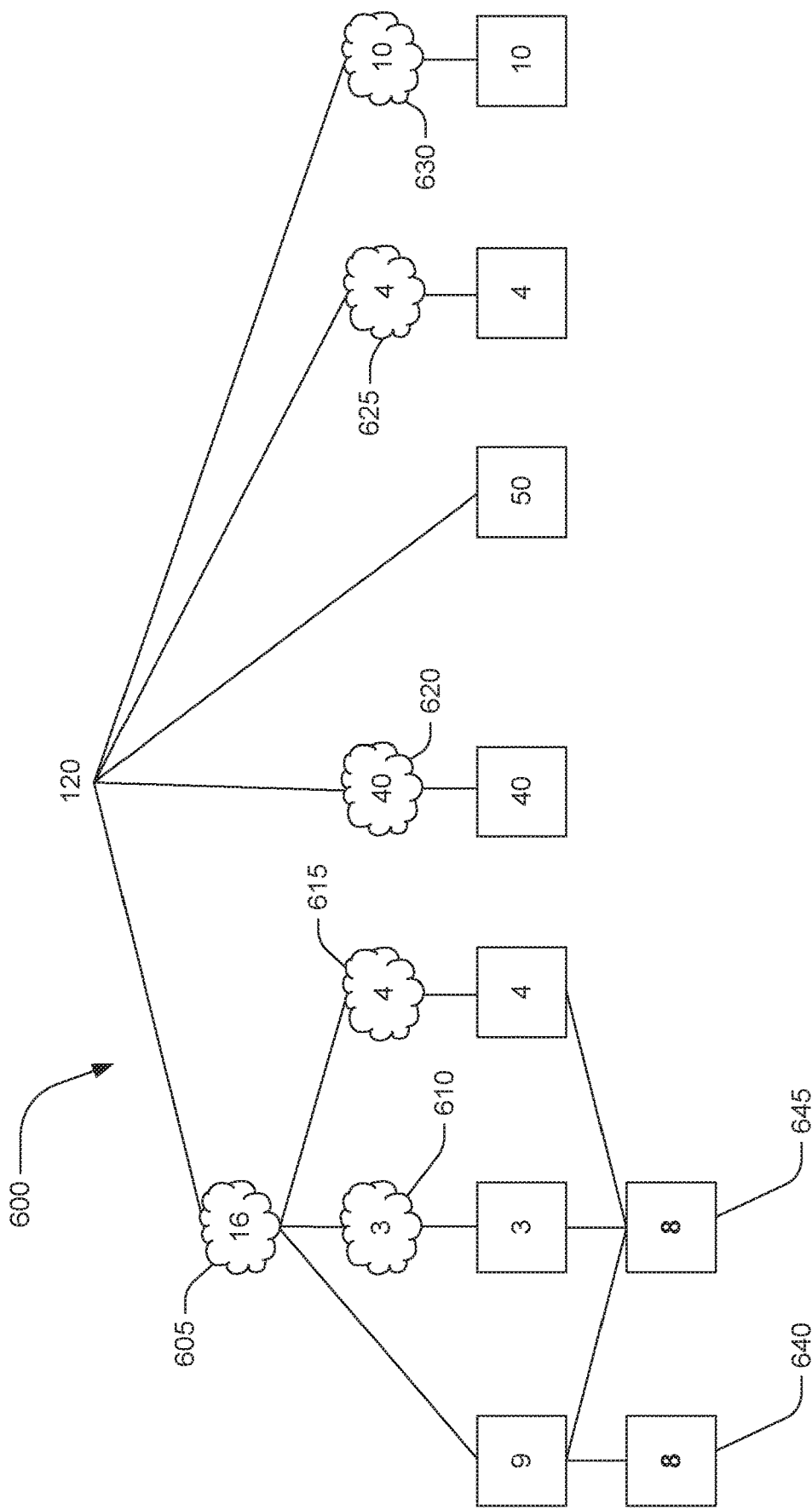

As shown in FIG. 6D, the flip-flops contained in nodes 610 and 615 may be combined. The combined flip-flops in nodes 610 and 615 equal 7 flip-flops. An exemplary partitioning procedure may be to include two partitions under node 605 (e.g., a first partition including 9 flip-flops, and a second partition including the flip-flops from nodes 610 and 615, which is 7 flip-flops. However, it may be beneficial to have each partition, or at least neighboring partitions, to be balanced. Therefore, as shown in FIG. 6D, one flip-flop from flip-flops 640 may be placed into partition 645, to balance out the number of flip-flops per partition (e.g., 8 flip-flops per partition).

Figure 6E:
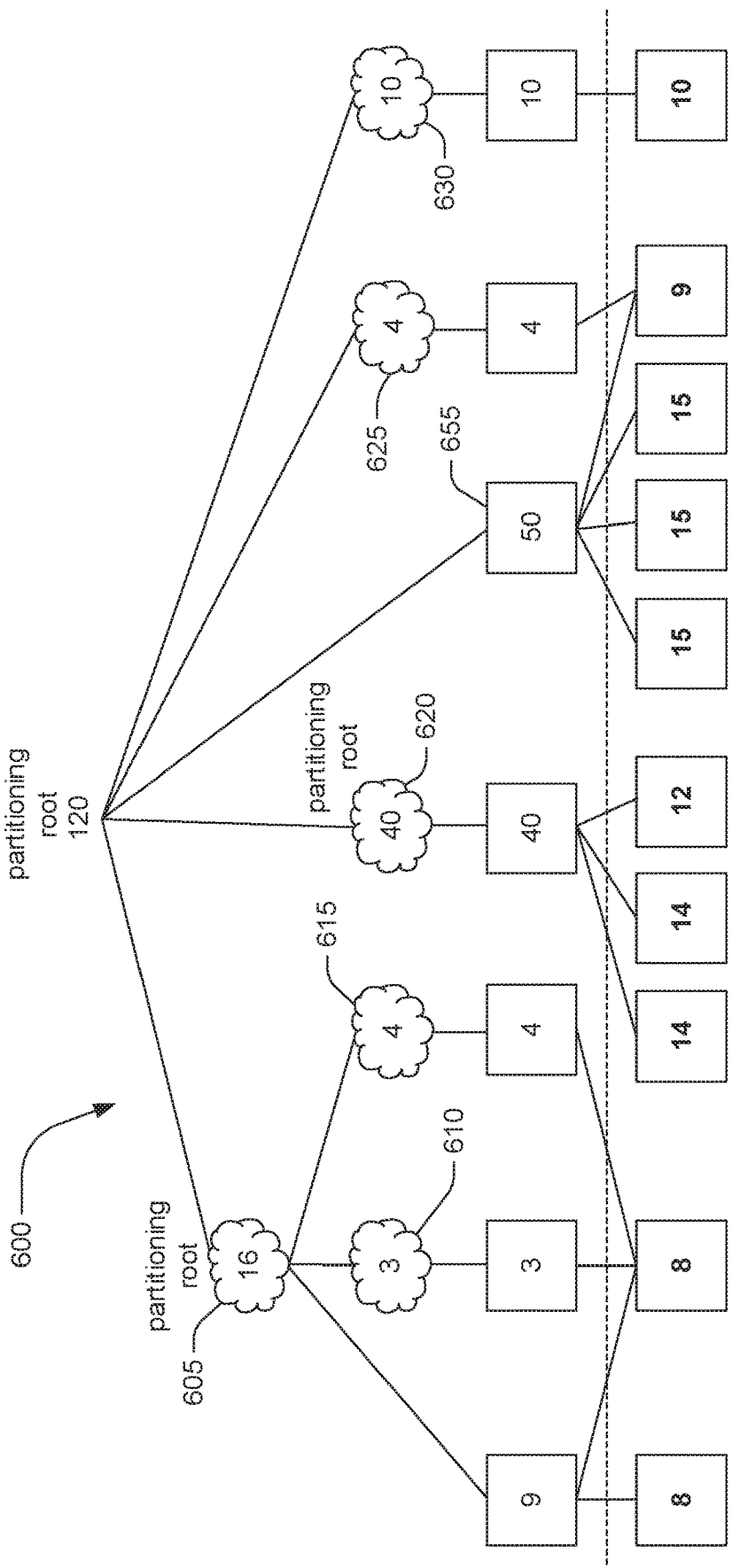

As shown in FIG. 6E, node 630 only contains 10 flip-flops. Thus, there is no need to partition flip-flops contained within node 630. Node 620 contains 40 flip-flops. Since there are a maximum number of 15 flip-flops per partition, node 620 needs to be split up. There are different ways of splitting up the number of flip-flops in node 620. For example, as shown in FIG. 6E, node 620 may be split up into 3 partitions (e.g., 2 partitions with 14 flip-flops and 1 partition with 12 flip-flops). Alternatively, node 620 may be split up into 2 partitions containing 13 flip-flops each and 1 partition containing 14 flip-flops.

Figure 6F:
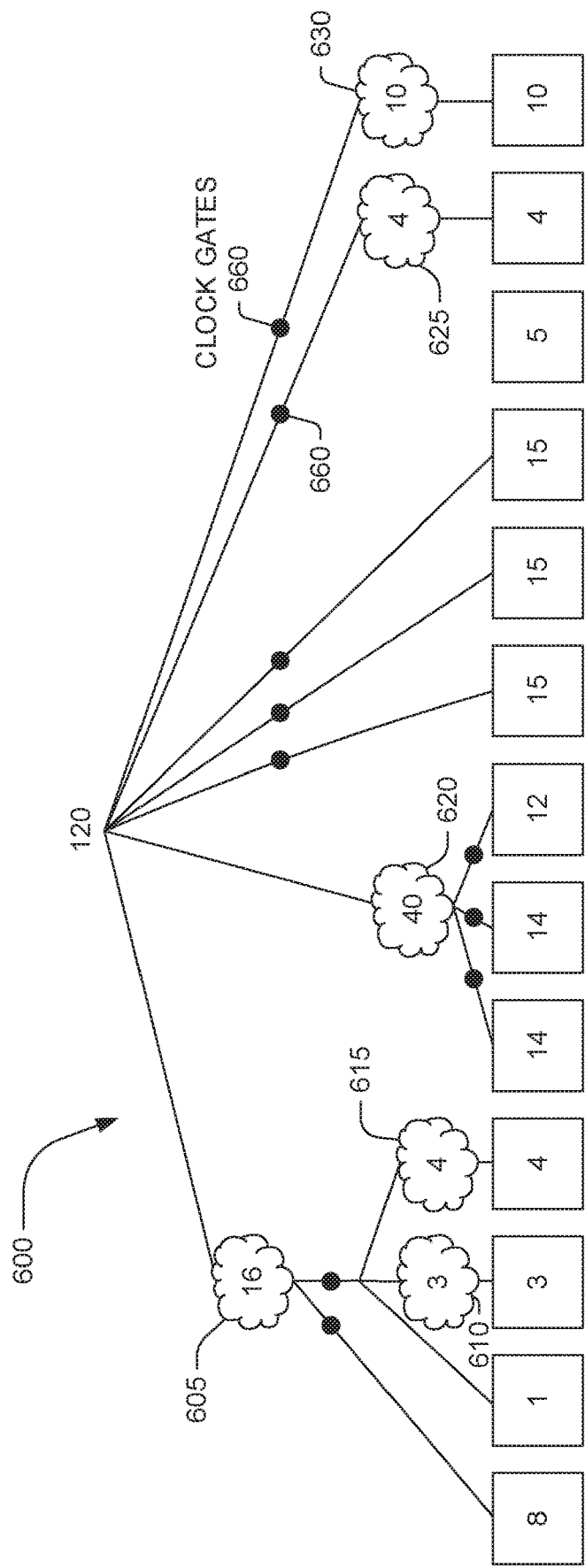

Clock network tree 600 contains flip-flops 655, which includes 50 flip-flops not under any nodes. Since this is greater than the maximum number of flip-flops per partition, flip-flops 655 need to be partitioned. In order to balance the number of flip-flops per partition, flip-flops 655 may be partitioned into 3 partitions, each partition having the maximum number of 15 flip-flops. However, 5 flip-flops would be remaining. Since node 625 only contains 4 flip-flops, the remaining 5 flip-flops may be included in the partition under node 625, combining into a total of 9 flip-flops. After all of the partitions have been determined, as shown in FIG. 6F, clock gates 660 may be inserted at the beginning of every partition to control the clock signal to each partition.

Figure 7A:
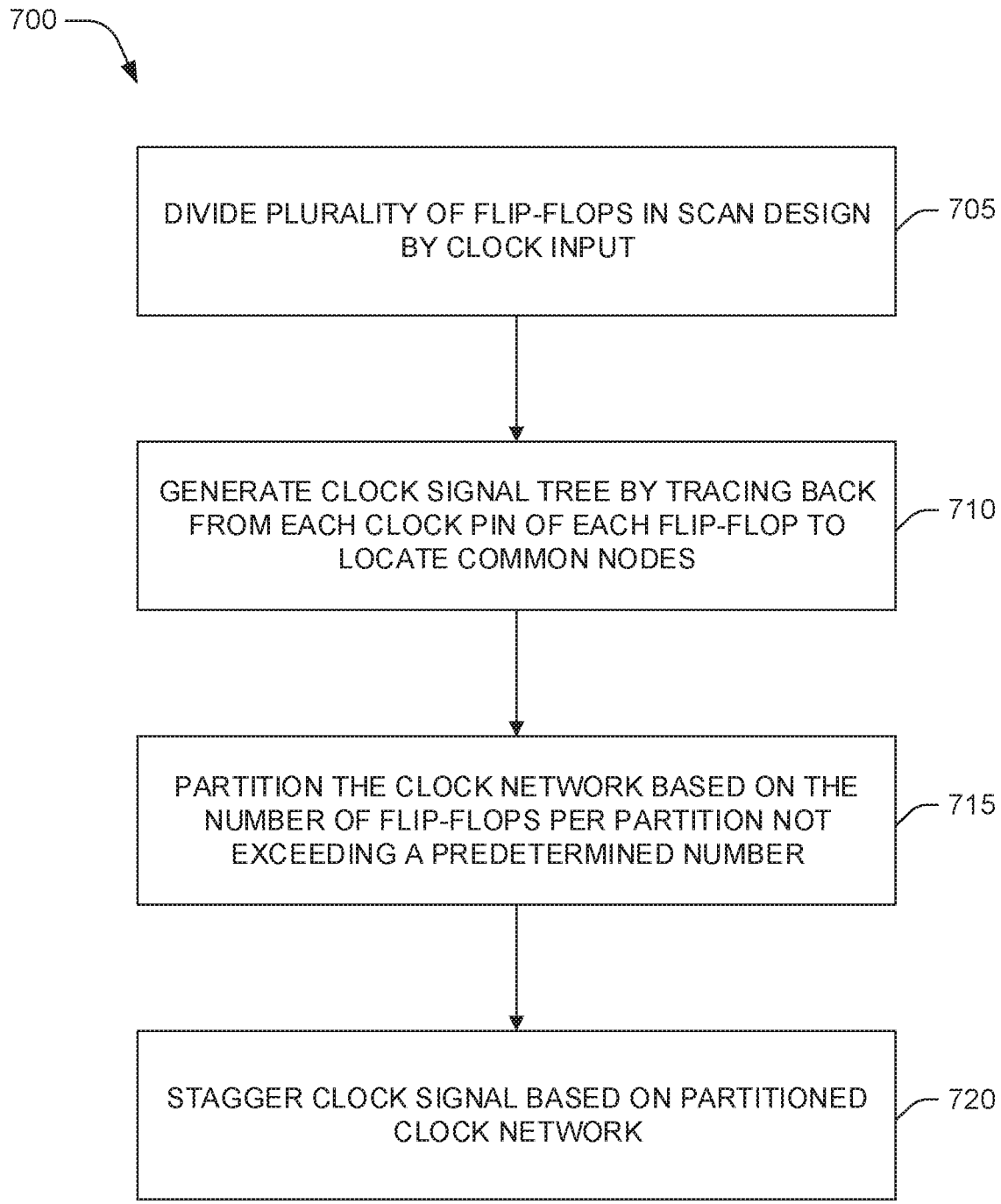
FIG. 7A is an exemplary flow diagram of a method for partitioning at least one clock network.

FIG. 7A is an exemplary flow diagram of a method 700 for partitioning a clock network. For example, at procedure 705, a plurality of flip-flops in a scan design may be divided. At procedure 710, a clock signal tree may be generated by tracing back from each clock pin of each flip-flop to locate common nodes. At procedure 715, the clock network may be partitioned based on the number of flip-flops per partition not exceeding a predetermined number. At procedure 720, the clock signal may be staggered based on the partitioned clock network.

Figure 7B:
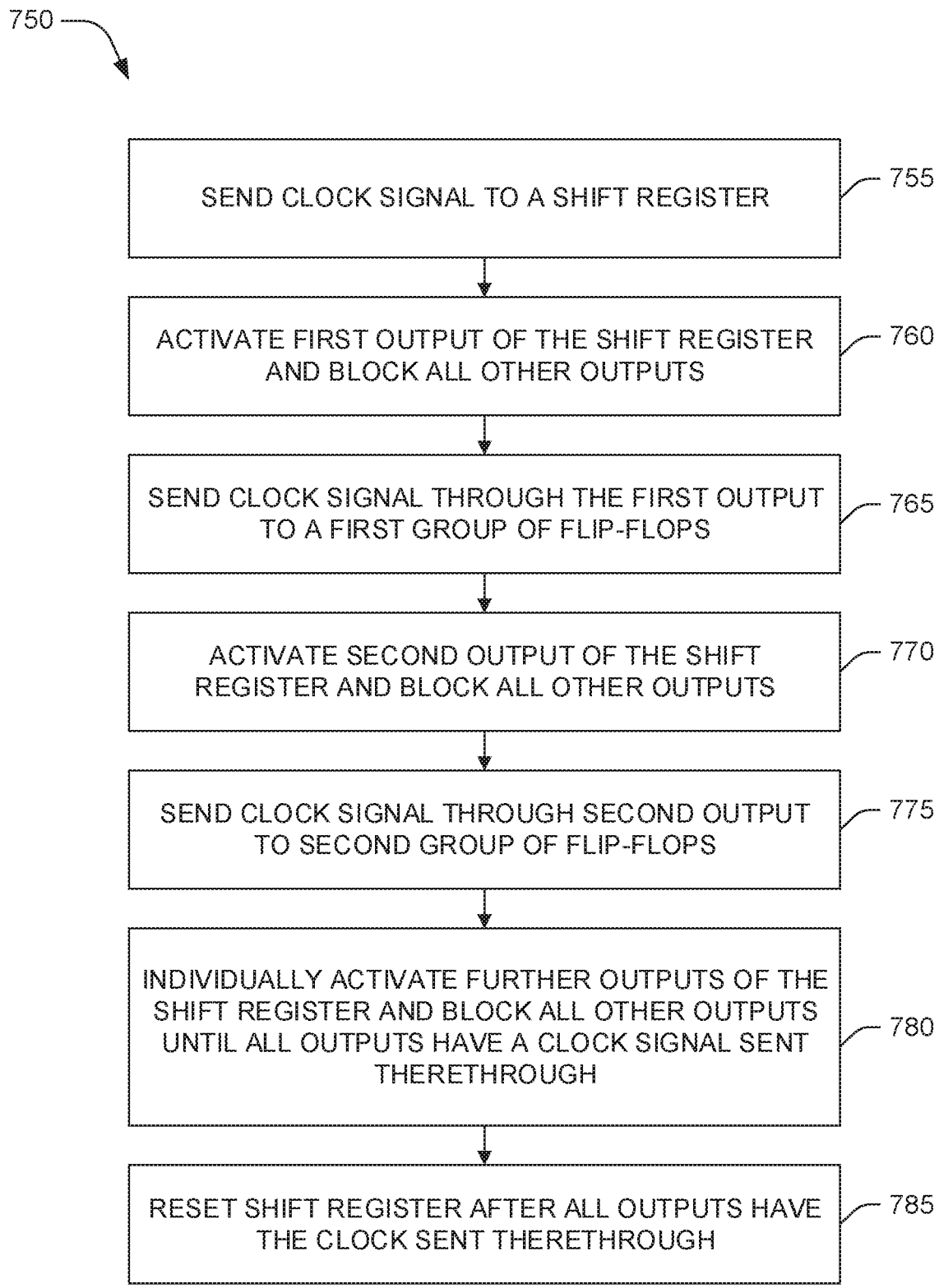
FIG. 7B is an exemplary flow diagram of a method for staggering a clock signal associated with a scan design.

FIG. 7B is an exemplary flow diagram of a method 750 for staggering a clock signal associated with a scan design. For example, at procedure 755, a clock signal may be sent to a shift register. At procedure 760, a first output of the shift register may be activated and all other outputs may be blocked. At procedure 765, a clock signal may be sent through the first output to a first group of flip-flops. At procedure 770, a second output of the shift register may be activated and all other outputs may be blocked. At procedure 775, the clock signal may be sent through the second output to a second group of flip-flops. At procedure 780, further outputs may be individually activated while all other outputs are blocked until a clock signal has been sent through every output. At procedure 785, the shift register may be reset after the clock signal has been sent through all outputs. For example, the shift register may loopback and the process may be repeated for as many times as the number of scan bits in the longest scan chain in the design. After the above process has completed, all scan chains have been fully loaded.

Figure 8:
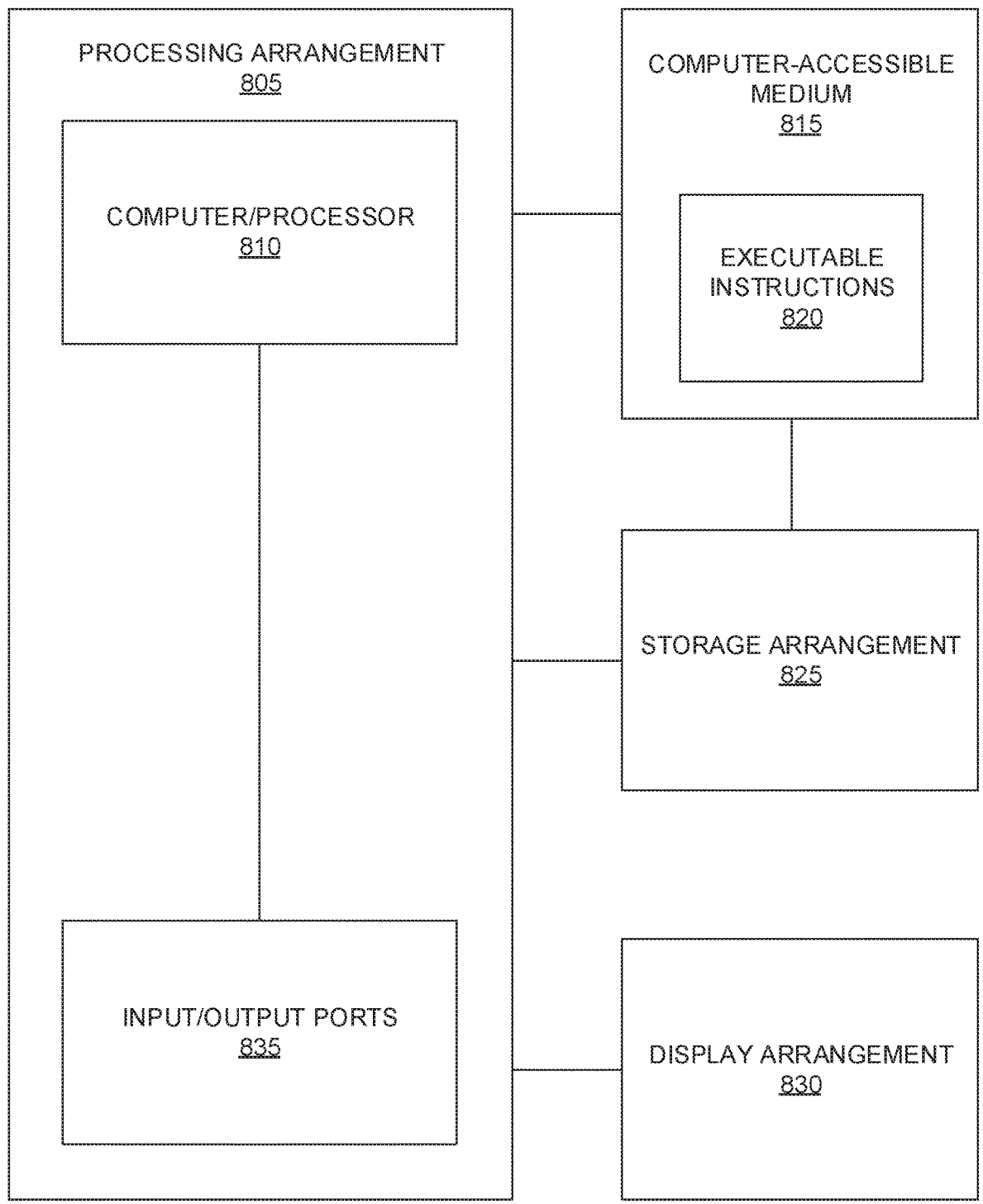
FIG. 8 is an illustration of an exemplary block diagram of an exemplary system in accordance with certain exemplary embodiments of the present disclosure.

FIG. 8 shows a block diagram of an exemplary embodiment of a system according to the present disclosure. For example, exemplary procedures in accordance with the present disclosure described herein may be performed by a processing arrangement and/or a computing arrangement 805. Such processing/computing arrangement 805 may be, for example entirely, or a part of, or include, but not be limited to, a computer/processor 810 that may include, for example, one or more microprocessors and use instructions stored on a computer-accessible medium (e.g., RAM, ROM, hard drive, or other storage device).

As shown in FIG. 8, for example, a computer-accessible medium 815 (e.g., as described herein above, a storage device such as a hard disk, floppy disk, memory stick, CD-ROM, RAM, ROM, etc., or a collection thereof) may be provided (e.g., in communication with the processing arrangement 805). The computer-accessible medium 815 may contain executable instructions 820 thereon. In addition or alternatively, a storage arrangement 825 may be provided separately from the computer-accessible medium 815, which may provide the instructions to the processing arrangement 805 so as to configure the processing arrangement to execute certain exemplary procedures, processes, and methods, as described herein above, for example.

Further, the exemplary processing arrangement 805 may be provided with or include an input/output arrangement port 835, which may include, for example, a wired network, a wireless network, the internet, an intranet, a data collection probe, a sensor, etc. As shown in FIG. 8, the exemplary processing arrangement 805 may be in communication with an exemplary display arrangement 830, which, according to certain exemplary embodiments of the present disclosure, may be a touch-screen configured for inputting information to the processing arrangement in addition to outputting information from the processing arrangement, for example. Further, the exemplary display 830 and/or a storage arrangement 825 may be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and may be thus within the spirit and scope of the disclosure. Various different exemplary embodiments may be used together with one another, as well as interchangeably therewith, as should be understood by those having ordinary skill in the art. In addition, certain terms used in the present disclosure, including the specification, drawings and claims thereof, may be used synonymously in certain instances, including, but not limited to, for example, data and information. It should be understood that, while these words, and/or other words that may be synonymous to one another, may be used synonymously herein, that there may be instances when such words may be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A clock distribution network for a scan design, comprising:
    at least one clock signal network; and
    a plurality of partitioned clock signal networks coupled to the at least one clock signal network through at least one controlling logic, each of the partitioned clock signal networks being connected to a different group of flip-flops in a scan chain, the at least one controlling logic comprising at least one shift register configured to stagger a clock signal from the at least one clock signal network to each of the groups of flip-flops such that only a proper subset of the groups of flip-flops receives the clock signal at a time.

2. The clock distribution network of claim 1, wherein the at least one shift register is configured to stagger the clock signal to each of the groups of flip-flops such that only one of the groups of flip-flops receives the clock signal at a time.

3. The clock distribution network of claim 1, further comprising at least one further controlling logic configured to control the clock signal.

4. The clock distribution network of claim 3, wherein the at least one further controlling logic includes a plurality of AND gates.

5. The clock distribution network of claim 4, wherein each of the AND gates is coupled to a particular clock signal network of the clock signal networks to control the clock signal as provided to the particular clock signal network.

6. The clock distribution network of claim 5, wherein each of the AND gates is located between the at least one controlling logic and a particular group of flip-flops coupled to the particular clock signal network.

7. The clock distribution network of claim 4, further comprising at least one shift enable signal line coupled to the plurality of AND gates.

8. The clock distribution network of claim 7, wherein the at least one shift enable signal line is configured to enable a capture mode of the group of flip-flops based on a shift enable signal provided on the at least one shift enable signal line being disabled.

9. The clock distribution network of claim 1, wherein the partitioned clock signal networks are based on at least one tree network determined in the at least one clock signal network.

10. The clock distribution network of claim 9, wherein the at least one tree network includes a plurality of nodes connected to the partitioned clock signal networks.

11. The clock distribution network of claim 1, wherein a number of flip-flops in the group of flip-flops is based on a maximum power requirement of the scan design.

12. The clock distribution network of claim 1, wherein the partitioned clock signal networks are based on a wire length to each of the flip-flops in the group of flip-flops.

* * * * *